(12) United States Patent
Dittmer et al.

(10) Patent No.: US 6,266,710 B1
(45) Date of Patent: Jul. 24, 2001

(54) SERIAL DATA TRANSFER DEVICE

(75) Inventors: Bernd Dittmer, Ludwigsburg-Ossweil; Franz Schwarz, Vaihingen, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/128,871

(22) Filed: Aug. 4, 1998

(30) Foreign Application Priority Data

Aug. 4, 1997 (DE) .............................. 197 33 748

(51) Int. Cl.[7] .................................................. G06F 3/00

(52) U.S. Cl. ................... 710/1; 710/58; 710/60; 710/61; 710/71

(58) Field of Search .................. 710/1, 58, 61, 710/60, 71

(56) References Cited

U.S. PATENT DOCUMENTS

| | | | |
|---|---|---|---|
| 4,710,922 | * 12/1987 | Scott | 370/112 |
| 5,465,079 | * 11/1995 | Bouchard et al. | 340/576 |
| 5,928,375 | * 7/1999 | Lucas et al. | 714/752 |

FOREIGN PATENT DOCUMENTS

| | | |
|---|---|---|
| 35 37 477 | 4/1987 | (DE) . |
| 0 466 591 | 1/1992 | (EP) . |

* cited by examiner

*Primary Examiner*—Ario Etienne
(74) *Attorney, Agent, or Firm*—Kenyon & Kenyon

(57) ABSTRACT

A data transfer device for unidirectional serial data transfer from a transmitting device to a receiving device, in particular from a microcontroller to an output stage IC of a motor vehicle control unit. The data transfer device includes a P/S converter provided in the transmitting device for converting a parallel data stream made available in the transmitting device into a serial data stream with transfer frames of a predefined format and for transmitting the serial data stream to the receiving device over a data transfer channel. The data transfer device also includes an S/P converter provided in the receiving device for converting the transmitted serial data stream back into a parallel data stream, and a clock signal generating device for generating a clock signal and for sending the clock signal to the P/S converter and the S/P converter to perform the conversion operations continuously and in-phase. In addition, the data transfer device includes a synchronizing device for generating a synchronizing signal according to the conversion operation of the P/S converter and for supplying the same to the S/P converter for synchronizing the conversion operations.

24 Claims, 6 Drawing Sheets

SERIAL DATA TRANSFER DEVICE

FIELD OF THE INVENTION

The present invention relates to a data transfer device for unidirectional serial data transfer from a transmitting device to a receiving device, in particular from a microcontroller to an output stage IC of a motor vehicle control unit.

BACKGROUND INFORMATION

Serial data transfer has the significant advantage over parallel data transfer that fewer connecting lines are needed. In parallel data transfer, one transmission channel is needed for each bit of a data word to be sent, but with serial data transfer, all the bits of a data word are transmitted over the same transmission channel. This advantage is important in particular in data transfer over great distances. In general, serial transfer is used even for short distances if the reduced information transfer rate in comparison with parallel data transfer does not cause trouble.

In principle, in serial data transfer, the data word to be transmitted is shifted bit by bit on the transmitting end and is transmitted bitwise over the transmission channel and reconstructed by appropriate shifting on the receiver end. The transmission channel in this context is an electrical, optical or wireless, e.g., radio, connection for transfer of information.

A central difficulty in serial data transfer is synchronization between the transmitter and the receiver. The serial bit sequence is usually subdivided into individual blocks (transfer frames). In synchronous transfer, a certain bit sequence (synchronizing word) which cannot occur otherwise is inserted for synchronization. In this way, the receiver can recognize the beginning of a data block. In asynchronous transfer, the transmitting and receiving cycles are not synchronized, but instead they are set only approximately (about 3%) at the same frequency, and for each data burst a start signal and a stop signal are transmitted over the transmission channel as synchronizing signals. Therefore, only short data blocks can be transmitted between two synchronizing signals in asynchronous transfer.

In the related art, there are several different known serial interface formats for exchanging data between integrated components, e.g., the I²C bus (inter-integrated circuit bus) from IBM, the SPI interface (serial peripheral interface) and the SIOP port (simple serial I/O port) from Motorola.

The I²C bus has low transfer rates, namely less than 100 kbit/s. The maximum load on the bus is limited by the maximum bus capacity of 400 pF.

The SPI interface is usually operated asynchronously, and can be used only for short distances at a maximum of 4 Mbit/s.

The SIOP port is merely a slightly simplified form of SPI interface, but it operates according to the same principle.

Although it can be applied to any data transfer devices and interface devices, the present invention and the object on which it is based are explained in greater detail below with respect to serial data transfer from a microcontroller to an output stage IC (IC=integrated circuit), in particular of an automotive control unit.

FIG. 6 shows a conventional parallel control of an output stage IC by a microcontroller with an additional serial SPI diagnostic interface.

In FIG. 6, a transmitting device 10 is in the form of a microcontroller, and a receiving device 20 is in the form of an output stage IC to be driven by that microcontroller in parallel. The microcontroller has eight parallel output ports P0 to P7 connected to corresponding data lines D0–D7. At the other end, output stage IC has eight corresponding data inputs E0 to E7, which are connected to corresponding data lines D0–D7. For example, data inputs E0 to E7 are each connected to a gate of a corresponding driver (indicated schematically).

A separate bidirectional serial interface 25, e.g., in the form of a conventional SPI interface, is provided for diagnostic purposes; it is subject to much lower demands with regard to information transfer rate but must work in the duplex mode.

The control concept used so far and illustrated in FIG. 6 thus calls for 8-bit point-to-point parallel coupling via data lines D0–D7. Owing to the increasing integration of functions in one microcontroller, there is necessarily also an increase in number of required data lines and pins. This has a negative effect on costs and operating reliability.

FIG. 7 shows the starting point for serial control of an output stage IC by a microcontroller according to the present invention.

Identical components or components having the same function in FIG. 7 are labeled with the same reference numbers as those in FIG. 6. In addition, microcontroller 10 has a conventional parallel-to-serial converter 12 which is connected at its parallel input end to data lines D0' to D7'. A serial transfer line DS is connected at one end to the serial output end of parallel-to-serial converter 12. At the other end, output stage 20 also has a conventional serial-parallel converter 22 which is connected at its serial input end to transfer line DS and at its parallel output end to data lines D0" through D7". Data lines D0" through D7" are connected to corresponding data inputs E0 through E7 of output stage IC 20.

Thus, with this concept, the data and control signals are transmitted serially over single data line DS.

Serial data transfer to the output stage control reduces the number of pins on the transmitting microcontroller and on receiving output stage IC, and thus the associated enclosure costs. A lower number of pins makes the device even more fail-safe due to reduced contacting faults in IC manufacture and circuitboard assembly. A simpler and less expensive manufacturing process can thus be used for handling the corresponding components.

The disadvantages to be eliminated by the present invention include the fact that the usual synchronous serial data transfer devices are slow and/or they have a complicated design due to address parts contained in the transfer frame, for example. For analysis of conventional asynchronous serial interfaces, oversampling is always required, thereby reducing the maximum transfer rate by a multiple in comparison with the synchronous interface protocol described above.

SUMMARY OF THE INVENTION

The data transfer device according to the present invention is advantageous in that it has a high transfer rate for resolution of time-critical actuators such as injection valves, ignition, etc. It can achieve transfer rates (baud rates) up to almost the level of the available system clock.

Since there is no multiple assignment on the receiving end, no address part is necessary in the transfer frame either, thus simplifying the hardware expense for generation/ analysis of the transfer frames. No duplex mode is necessary either, because the transmitting device and the receiving device do not communicate bidirectionally with one another over the channel according to the present invention.

Due to this seamless operation, no complicated handshake device is necessary, where possible errors are recognized and easily eliminated by a following data word. In general, faulty transfers can be stored on the receiving end for analysis and displayed by a status flag or IC pin or a conventional diagnostic interface.

According to the present invention, the respective conversion operations of the P/S and S/P converters are performed continuously by, and in-phase with, the clock signal and are synchronized by the synchronizing signal according to the conversion operation of the P/S converter.

According to another embodiment, the P/S converter has an input register clocked with the clock signal for receiving the parallel data stream at a parallel input and for outputting a corresponding parallel output signal at a parallel output; a first shift register clocked with the clock signal, with a parallel input for receiving the parallel output signal and with a serial output for outputting the serial data stream to the data transfer channel; and a first internal bus for connecting the output of the input register to the input of the first shift register. This hardware design is very easy to implement.

According to another embodiment, the synchronizing device has a decrementing device clocked with the clock signal for generating a synchronizing signal according to a preselectable decrementing cycle, and the first shift register can be controlled by the synchronizing signal for inputting the input register output signal to be transferred over the first internal bus. This makes it possible for the shift register to be rewritten only after complete transfer of the contents of the first shift register to the data transfer channel. In addition, the separate synchronizing signal makes it possible to minimize the size of the transfer frame.

According to another embodiment, the synchronizing device has a synchronizing frame generating device for generating and inserting a predefined synchronizing frame into the serial data stream at the output of the first shift register. The synchronizing frame is expediently not inserted into the serial data stream after each transfer frame, but instead at fixed intervals or at longer, selectable intervals.

According to another embodiment, the S/P converter has a second shift register clocked with the clock signal for receiving the serial data stream at a serial input and for outputting a corresponding parallel output signal at a parallel output; an output register clocked with the clock signal for receiving the parallel output signal of the second shift register at a parallel input and for outputting the parallel data stream at a parallel output; and a second internal bus for connecting the output of the shift register to the input of the output register. This permits simple synchronization of the S/P converter.

According to another embodiment, the synchronizing device has a decrementer clocked with the clock signal for generating a synchronizing signal according to a predefinable decrementing cycle, and the output register can be controlled by the synchronizing signal for entering the parallel output signal of the second shift register transmitted over the second internal bus. This makes it possible for the output register to be rewritten only after complete transfer of the contents of a transfer frame to the second shift register.

According to another embodiment, the synchronizing device has a synchronizing frame generating device for generating and inserting a predefined synchronizing frame into the serial data stream at the output of the first shift register; the S/P converter has a synchronizing frame recognition device for recognizing the predefined synchronizing frame in the second shift register; and the output register can be controlled by the synchronizing frame recognition device for inputting the parallel output signal of the second shift register transmitted over the second internal bus.

According to another embodiment, the predefined format of the transfer frame has a start bit, a data word having a predefined number of bits, a parity bit and a stop bit and the length of the first and second shift registers corresponds to the predefined format. This format offers a large data component with little overhead. In particular, the start bit and the stop bit compensate for minor transit time effects (jitter), and the parity bit makes it possible to check on the correctness of the data transfer. As stated previously, an address is superfluous owing to the unambiguous assignment.

According to another improvement, the synchronizing frame has a format where all data bits are set, and the parity bit does not correspond to the set number of data bits. This permits non-interchangeability of data and synchronizing frame, which have the same length in principle. In addition, this format makes it easy to prevent the synchronizing frame from being written to the output register.

According to another embodiment, the P/S converter has a first parity generator connected to the first internal bus and the first shift register for generating the parity bit corresponding to the data bits and entering same into the first shift register.

According to another embodiment, the S/P converter has a second parity generator connected to the second internal bus and the output register for generating the parity bit corresponding to the data bits of the transfer frame and entering same as a load signal into the output register. This makes it possible to avoid loading faultily transferred data and/or the synchronizing frame into the output register.

According to another embodiment, the transmitting device has a device for changing the data word length of the parallel data stream and a device for the corresponding adjustment of the synchronizing signal. This increases the flexibility of the data transfer device according to the present invention.

According to another embodiment, the receiving device has a status/check register for programming the data word length of the parallel data stream and of the parity bit, as well as for outputting the status of the receiving device.

According to another embodiment, the receiving device has an error memory for storing faulty data transfers. This makes it possible to analyze transfer errors.

According to another embodiment, a separate serial interface, in particular an SPI interface, is provided between the transmitting device and the receiving device for transfer of diagnostic functions. Thus there is a clear separation between functional control and monitoring or diagnosis.

DETAILED DESCRIPTION

Figure 1:
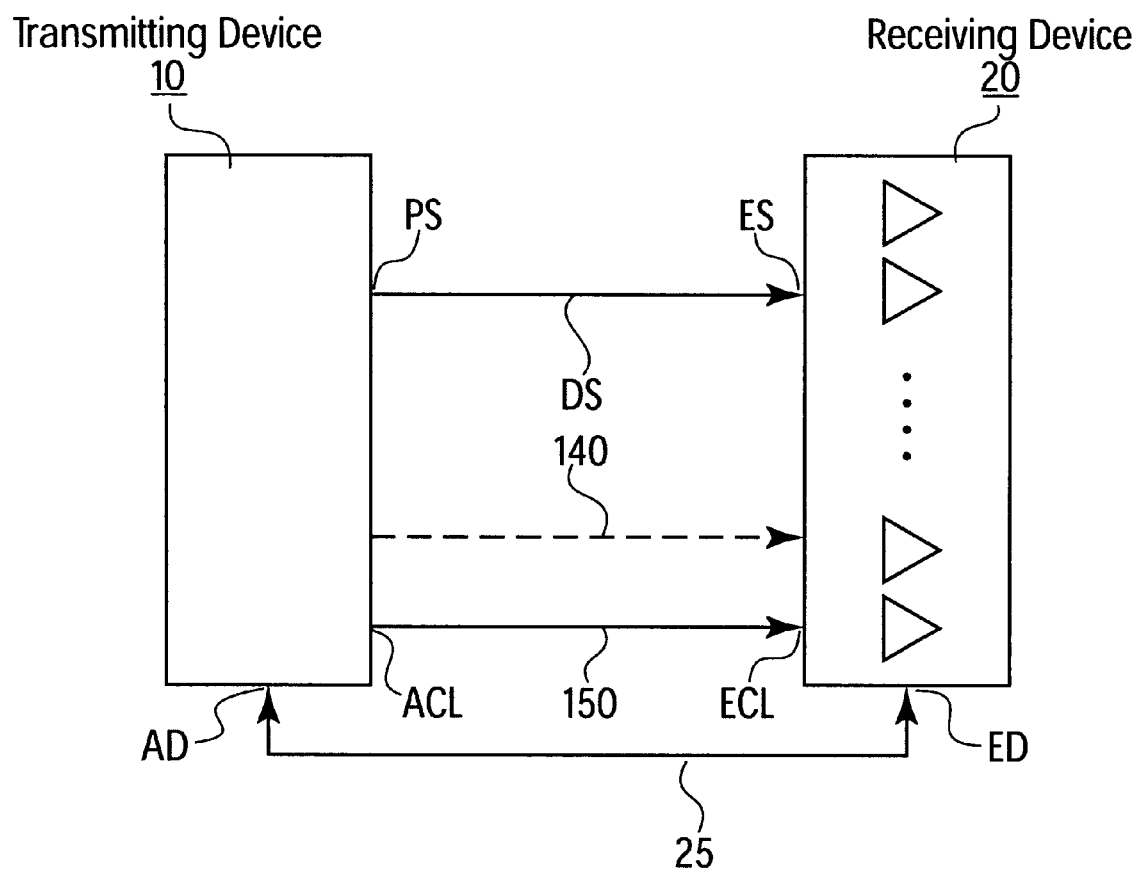
FIG. 1 shows a block diagram of a data transfer device according to the present invention.

FIG. 1 shows a block diagram for illustrating the data transfer device according to the present invention.

FIG. 1 shows a transmitting device 10 with a microcontroller and a receiving device 20 with an output stage IC of an automotive control unit to be controlled by a microcontroller. Transmitting device 10 has a serial output port PS which is connected via a data line DS to a serial input port ES of receiving device 20.

In addition to data line DS, a clock line 140 is provided between a clock output ACL of transmitting device 10 and a clock input ECL of receiving device 20.

A separate bidirectional serial interface 25 in the form of a conventional SPI interface for diagnostic purposes is provided between an output AD of transmitting device 10 and an input ED of receiving device 20.

The actual data transfer device for unidirectional serial data transfer from transmitting device 10 to receiving device 20 has a P/S converter provided in transmitting device 10, an S/P converter provided in receiving device 20, a clock signal generating device which is expediently provided in transmitting device 10 for generating the clock signal transmitted over clock line 150, and a synchronizing device for generating a synchronizing signal transmitted over a synchronizing line 140. Synchronizing line 140 is shown with broken lines because it may either be in the form of a separate line or be identical to data line DS, as explained in greater detail below.

These components and their functions are explained in detail below with reference to FIGS. 2 through 5.

Figure 2:
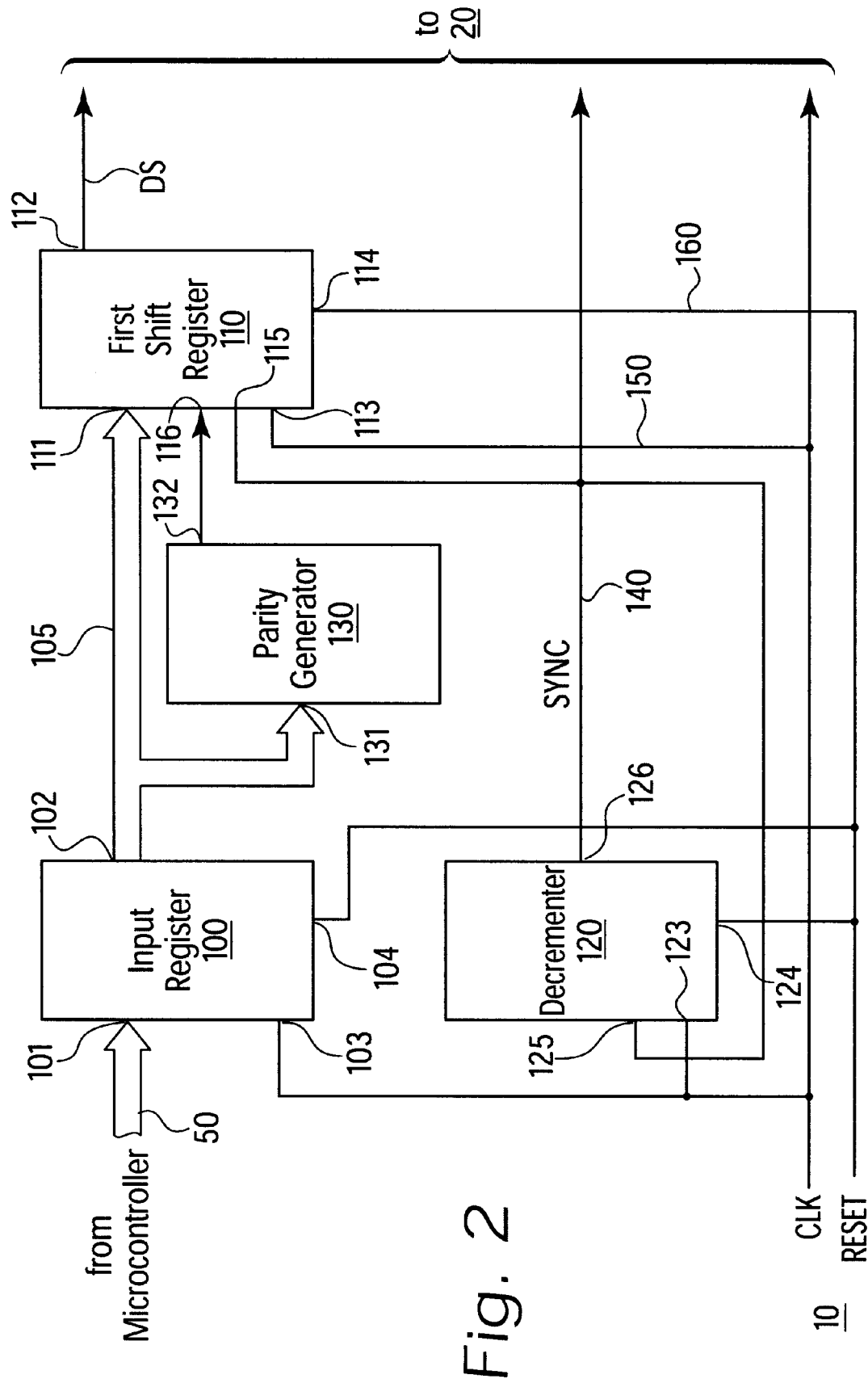
FIG. 2 shows a block diagram of a P/S converter as part of a transmitter device in an embodiment of the data transfer device according to the present invention.

FIG. 2 shows a block diagram of a P/S converter as part of transmitting device 10 according to a first exemplary embodiment of the data transfer device according to the present invention.

FIG. 2 shows an 8-bit-wide data bus 50 coming from the parallel output port of the microcontroller (not shown in FIG. 2). An input register 100 with a width of 8 bits, has a parallel input 101, a parallel output 102, a clock input 103 and a reset input 104. There is an 8-bit-wide first internal bus 105, a first shift register 110 having a width of 11 bits with a parallel input 111, a serial output 112 connected to data line DS, a clock input 113, a reset input 114, a load signal input 115 and a parity bit input 116. A decrementer 120 with a preselectable decrementing value of 4 bits has a clock input 123, a reset input 124, a load signal input 125 and a synchronizing signal output 126. A parity generator 130 has a parallel input 131 and a parity bit output 132.

Finally, there is a synchronizing signal line 140 for transmitting synchronizing signal SYNC, a clock signal line 150 for transmitting clock signal CLK and a reset signal line 160 for transmitting reset signal RESET.

Figure 3:
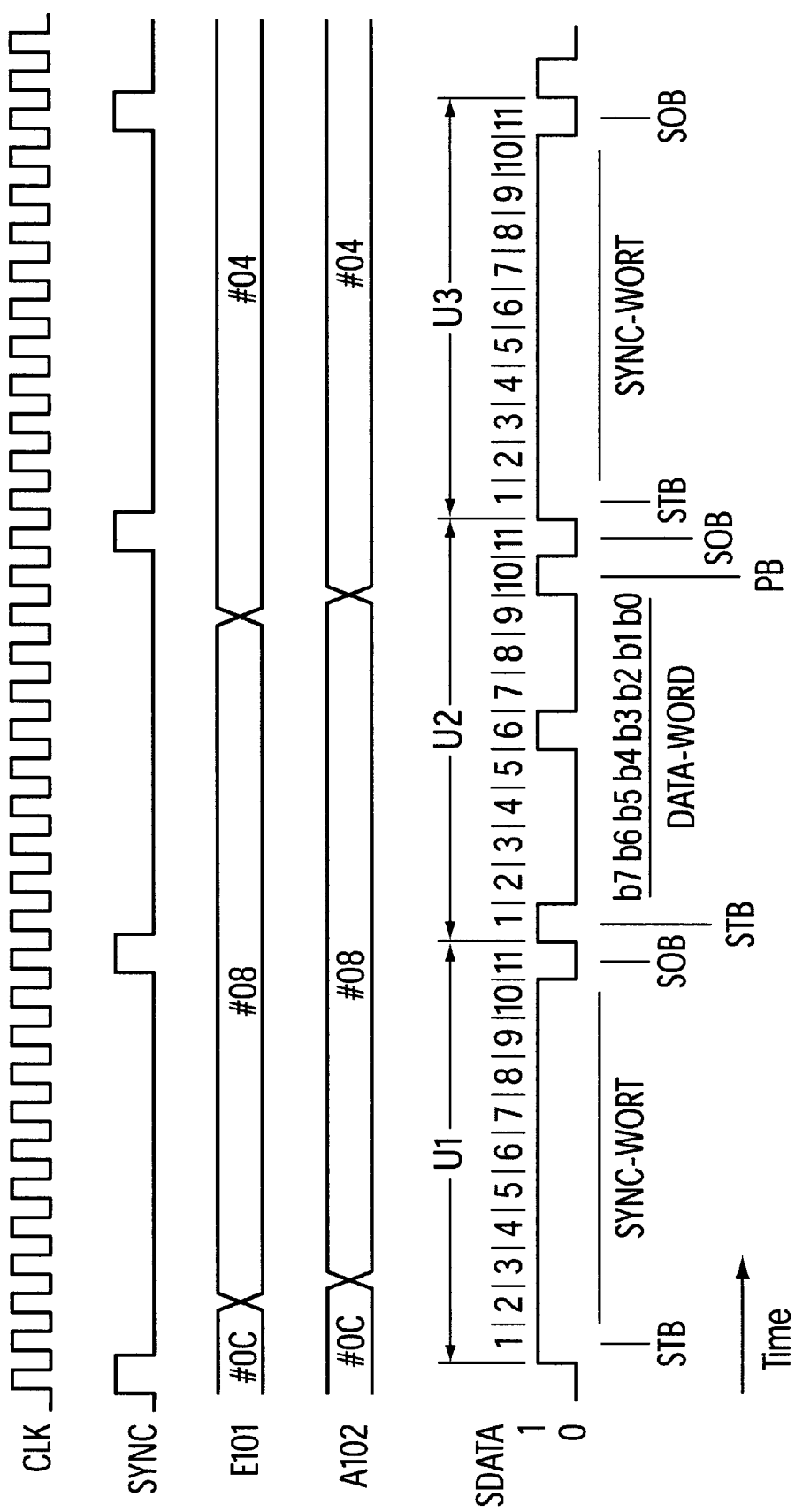
FIG. 3 shows a time sequence chart of the signals of the P/S converter the data transfer device according to the present invention.

FIG. 3 shows a time sequence chart of the signals of the P/S converter in the first embodiment of the data transfer device according to the present invention.

FIG. 3 shows clock signal CLK, synchronizing signal SYNC with synchronizing pulses, input data E 101 at input 101 of input register 100, output data A 102 at output 102 of input register 100 and serial data stream SDATA on data line DS. In addition, this figure shows first through third transfer frames U1–U3, a data word DATA_WORT having eight data bits b0–b7, invalid data or synchronizing frame SYNC_WORT, a start bit STB, a stop bit SOB and a parity bit PB. The time axis runs from left to right in the horizontal direction.

Operation of the P/S converter according to the first embodiment of the data transfer device according to the present invention will now be described with reference to FIGS. 2 and 3.

Input register 100 clocked with clock signal CLK serves to receive the parallel data stream at its parallel input 101 and to output a corresponding parallel output signal at its parallel output 102 one clock cycle later. First internal bus 105 serves to connect output 102 of input register 100 to input 111 of first shift register 110.

First shift register 110 clocked with clock signal CLK serves to receive the parallel output signal of input register 100 at its parallel input 111 and to output serial data stream SDATA to data transfer line DS at its serial output 112.

Decrementer 120 clocked with clock signal CLK serves to generate synchronizing signal SYNC according to a preselectable decrementing cycle. First shift register 110 is controllable by synchronizing signal SYNC for inputting of the output signal of input register 100 transmitted over first internal bus 105.

First parity generator 130, e.g., an XOR logic device connected to first internal bus 105 and first shift register 110, serves to generate parity bit PB corresponding to the data bits and to input same into first shift register 110.

Each of transfer frames U1, U2 and U3 have 11 bits, namely a start bit STB, eight data bits b0–b7, a parity bit PB and a stop bit SOB. Accordingly, decrementer 120 is set to generate a synchronizing signal SYNC after eleven clock cycles of clock signal CLK. Synchronizing signal SYNC causes first shift register 110 to load data bits b0 through b7 supplied on first internal bus 105 over input register 100, parity bit PB supplied by first parity generator 130 and, internally, start bit STB and stop bit SOB. Then first shift register 110 must not be loaded again until these eleven bits have been moved out onto data line DS, i.e., for eleven clock cycles of clock signal CLK.

In the example shown in FIG. 3, only second transfer frame U2 contains valid data, namely #08 (hexadecimal 08=binary 00001000). However, first and third transfer frames U1 and U3 do not contain any valid data because the parity bit does not fit the respective binary data 11111111 with even parity i.e., the parity bit is 0 when there is an even number of 1 bits.

However, such invalid data, which occur very rarely in practice due to external interference, lead to a second embodiment of the P/S converter as part of transmitter device 10 of the data transfer device according to the present invention.

In the second embodiment, instead of decrementer 120, a synchronizing frame generating device (not shown in FIG. 2) is provided instead of decrementer 120 for generating and inserting a predefined synchronizing frame SYNC_WORT into the serial data stream, i.e., between the normal valid transfer frames, at output 112 of first shift register 110. The form of the first and third transfer frames shown in FIG. 3 is selected for synchronizing frame SYNC_WORT, i.e., all eight data bits and the parity bit are 1.

Although it is possible to insert a synchronizing frame SYNC_WORT after each normal transfer frame, with this second embodiment it is possible to insert a synchronizing frame SYNC_WORT after only one transfer frame or after a larger number of normal transfer frames, depending on use conditions. However, this must be taken into account in an appropriate manner on the receiver end.

Figure 4:
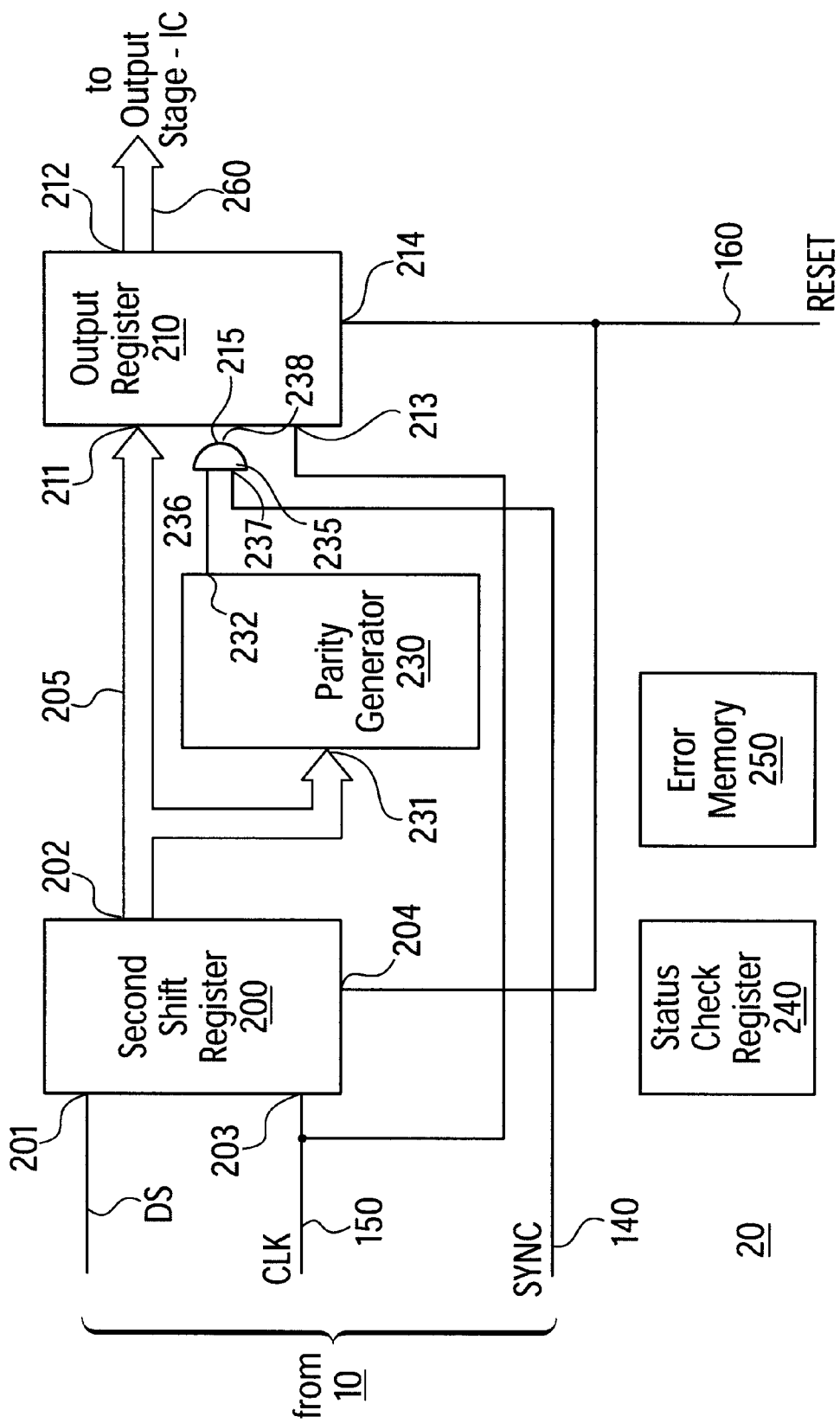
FIG. 4 shows a block diagram of an S/P converter as part of a receiving device of the data transfer device according to the present invention.

FIG. 4 shows a block diagram of an S/P converter as part of receiving device 20 in the first embodiment of the data transfer device according to the present invention.

FIG. 4 shows a second shift register 200 with a width of 11 bits, having a serial input 201 connected to data line DS, a parallel output 202, a clock input 203 and a reset input 204. There is a second internal bus 205, eleven bits wide, and an output register 210 eight bits wide, having a parallel input 211, a parallel output 212, a clock input 213, a reset input 214 and a load signal input 215. There is a parity generator 230, having a parallel input 231 and a parity bit output 232. An AND gate 235 has a first input 236, a second input 237 and an output 238. A status/check register 240 is provided, together with an error memory 250 and an 8-bit-wide data bus 260 running to the parallel input port of output stage IC (not shown in FIG. 4).

Figure 5:
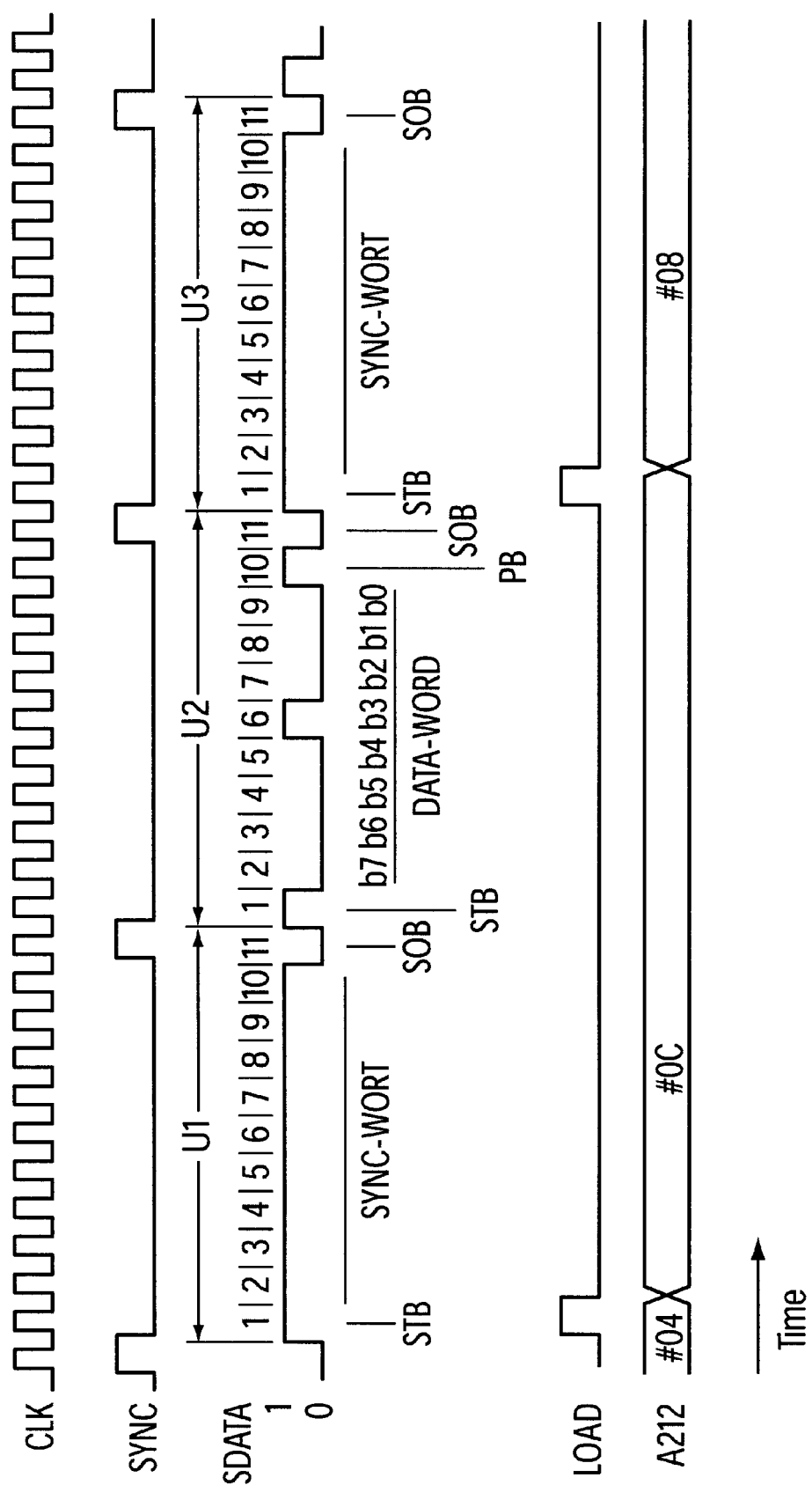
FIG. 5 shows a time sequence chart of the signals of the S/P converter of the data transfer device according to the present invention.
Figure 6:
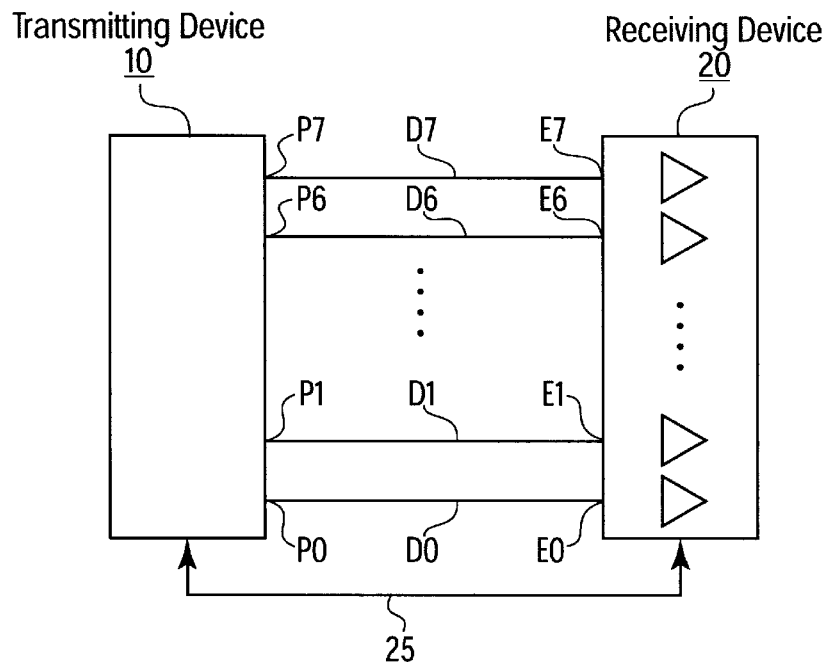
FIG. 6 shows a conventional parallel control of an output stage IC by a microcontroller with an additional serial SPI diagnostic interface.
Figure 7:
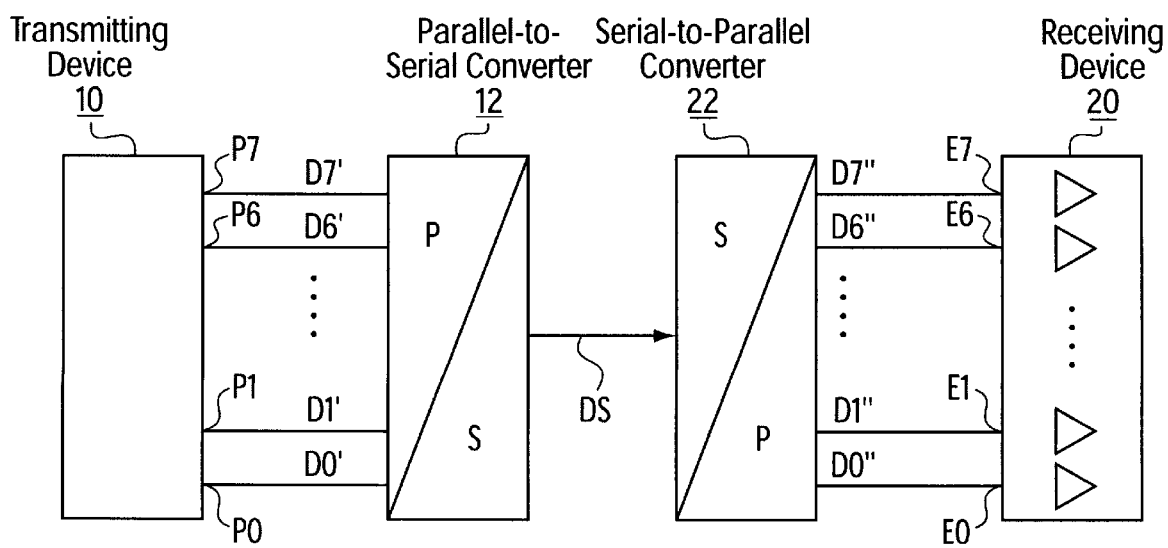
FIG. 7 shows a starting point for the serial control of an output stage IC by a microcontroller according to the present invention.

FIG. 5 shows a time sequence chart of the signals of the S/P converter according to the first embodiment of the data transfer device according to the present invention.

FIG. 5 shows clock signal CLK, synchronizing signal SYNC with synchronizing pulses, serial data stream SDATA on data line DS, load signal LOAD, and output data A 212 at output 212 of output register 210. It also shows first to third transfer frames U1–U3, data word DATA_WORT having eight data bits b0–b7, invalid data or synchronizing frame SYNC_WORT, start bit STB, stop bit SOB and parity bit PB. The time axis runs from left to right horizontally.

The operation of the S/P converter for the first embodiment of data transfer device according to the present invention will now be described with reference to FIGS. 4 and 5.

Second shift register 200 clocked with clock signal CLK receives serial data stream SDATA at a serial input 201 and to output a corresponding parallel output signal at a parallel output 202. Second internal bus 205 connects output 202 of second shift register 200 to input 211 of output register 210.

Output register 210 clocked with clock signal CLK receives the parallel output signal of second shift register at its parallel input 211 and outputs the parallel data stream to its parallel output 212 which is connected to output stage IC over data bus 260.

Second parity generator 230 connected to second internal bus 205 and output register 210 serves to generate parity bit PB corresponding to the data bits of the transfer frame and to enter same as an input signal at input 236 of AND gate 235. Synchronizing signal SYNC is carried to other input 237 of AND gate 235. The output signal of AND gate 235 at output 238 serves as a load signal for output register 210.

The serial data stream is input into second shift register 200 with clock-controlled synchronization. Output register 210 is controlled by synchronizing pulse SYNC after eleven clock cycles for inputting the parallel output signal of second shift register 200 transmitted over second internal bus 205. This signal is linked through AND gate 235 to the condition that parity bit PB supplied by second parity generator 230 corresponds to data bits b0 through b7. In other words, neither faultily (e.g., erroneously) transmitted data nor synchronizing frames (e.g., for the second embodiment) are input into output register 210. Then only the relevant eight data bits b0 through b7 appear at parallel output 212 of the output register.

In the second embodiment of the P/S converter described above, the S/P converter has a synchronizing frame recognition device instead of AND gate 235 to recognize predefined synchronizing frame SYNC_WORT in second shift register 200. Output register 210 is then controllable by this synchronizing frame recognition device and the parity bit for inputting the parallel output signal of first shift register 200 transmitted over second internal bus 205.

In particular, through the synchronizing frame recognition device, the serial data stream in second shift register 200 is sampled until a synchronizing frame SYNC_WORT is recognized. As a result, the synchronizing frame recognition device then controls output register 210 after eleven clock cycles for inputting the parallel output signal transmitted over second internal bus 205 if its parity bit is correct.

In general, in the event of a faulty transfer, the transfer is not repeated, but instead the latest state is retained. The transfer of the data transfer device according to the present invention thus takes place continuously, and the states with the greatest possible repeat rate are transmitted constantly even without a change in the output states in the microcontroller.

Status/check register 240 in receiving device 20 permits programming of the data bit width and the parity bit as well as output regarding the status of the output stage IC (e.g., whether it is active or not) and of error memory 250 (e.g., the number of faulty data transfers).

There is in general a certain delay with the P/S converter and the S/P converter according to the present invention, which influences the interface rate. Certain delays also result from the fact that the parallel data stream from the microcontroller changes asynchronously with the system clock.

The following Table I describes the various delay times for the circuits according to the first and second embodiments described above.

TABLE I

| System clock period | $T_{CLK}$ |
| --- | --- |
| Delay of input register | $1 * T_{CLK}$ |
| Delay of shift register | $1 * T_{CLK}$ |
| Delay of output register | $1 * T_{CLK}$ |
| Delay of data | $8 * T_{CLK}$ |
| Delay of start bit, stop bit, parity bit | $3 * T_{CLK}$ |
| Delay of transfer frame | $11 * T_{CLK}$ |
| Delay of synchronizing frame | $11 * T_{CLK}$ |

This yields $14[*T]_{CLK}$ as the minimum delay time for the first embodiment and $24*T_{CLK}$ as the maximum delay time plus an update time of $11*T_{CLK}$ for the output data. At a clock pulse frequency of $f_{CLK}=1/T_{CLK}=10$ MHZ, this corresponds to a minimum delay time of 1.4 μs, a maximum delay time of 2.4 μs, and an update time of 1.1 μs for the output data.

This also yields $14*T_{CLK}$ as the minimum delay time for the second embodiment, $35*T_{CLK}$ as the maximum delay time and $22*T_{CLK}$ as the update time for the output data (under the assumption that every second frame is a synchronizing frame). At a clock pulse frequency of $f_{CLK}=1/T_{CLK}=10$ MHZ, this corresponds to a minimum delay time of 1.4 μs, a maximum delay time of 3.5 μs, and an updating time of 2.2 μs for the output data.

Although the present invention was described above on the basis of first and second embodiments, it is not limited to these embodiments but instead can be modified in a variety of ways.

In particular, one exemplary application of the present invention described above is for a motor vehicle control unit, where only a slight distance on the order of a few cm to a few times 10 cm, preferably 10–20 cm, need be bridged between the microcontroller and the output stage IC. Nevertheless, the present invention is suitable in principle for all forms of data transfer.

Another possibility of synchronizing data transfer is to use a start bit having a length of one and a half data bits. Then the serial data stream is sampled with each edge of the clock pulse (positive and negative). The start bit is thus recognized over three clock pulse edges, and the data bits and stop bit are recognized over only two edges. This method of analysis does not use synchronization by a synchronizing word, but it does make higher demands of the timing of the circuit components.

In general, not only is the present invention suitable for converting 8-bit-wide parallel data into serial data and back again, but instead any desired n-bit-wide (n=natural number) parallel output port may be provided, to be connected to a corresponding data bus. The length of the serial transfer frame then changes accordingly, i.e., to n+3 according to the above example.

| List of reference numbers | |
| --- | --- |
| 10 | transmitting device |
| 20 | receiving device |
| PS | serial port |
| ES | serial port |
| DS | data line |
| 140 | synchronization line |
| 150 | clock pulse line |
| ACL | clock pulse output |
| ECL | clock pulse input |
| 25 | diagnostic interface |
| AD | diagnostic port |
| ED | diagnostic port |
| 50 | parallel data bus |
| 100 | input register |
| 101 | input of 100 |
| 102 | output of 100 |
| 103 | clock input of 100 |
| 104 | reset input of 100 |
| 105 | first internal bus |
| 110 | first shift register |
| 111 | input of 110 |
| 112 | output of 110 |
| 113 | clock input of 110 |
| 114 | reset input of 110 |
| 115 | loading input of 110 |
| 116 | parity input of 110 |
| 120 | decrementer |
| 123 | clock input of 120 |
| 124 | reset input of 120 |
| 125 | loading input of 120 |
| 126 | synchronizing input of 120 |
| 130 | first parity generator |
| 131 | input of 130 |
| 132 | output of 130 |
| 160 | reset line |
| CLK | clock signal |
| RESET | reset signal |
| SYNC | synchronizing signal |
| E101 | signal at 101 |
| A102 | signal at 102 |
| SDATA | serial data stream |
| U1, U2, U3 | transfer frame |
| DATA_WORT | data word |
| SYNC_WORT | synchronizing frame |
| STB | start bit |
| SOB | stop bit |
| PB | parity bit |
| b0–b7 | data bits |
| 200 | second shift register |
| 201 | input of 200 |

-continued

| List of reference numbers | |
| --- | --- |
| 202 | output of 200 |
| 203 | clock input of 200 |
| 204 | reset input of 200 |
| 205 | second internal bus |
| 210 | output register |
| 211 | input of 210 |
| 212 | output of 210 |
| 213 | clock input of 210 |
| 214 | reset input of 210 |
| 215 | loading input of 210 |
| 230 | second parity generator |
| 231 | input of 230 |
| 232 | output of 230 |
| 235 | AND gate |
| 236 | first input of 235 |
| 237 | second input of 235 |
| 238 | output of 235 |
| 240 | status/check register |
| 250 | error memory |
| 260 | data bus |
| LOAD | load signal |
| A212 | signal at 212 |
| P0–P7 | parallel ports |
| D0–D7, D0'–D7', D0"–D7" | data lines |
| E0–E7 | data inputs |
| 12 | P/S converter |
| 22 | S/P converter |

What is claimed is:

1. A data transfer device for unidirectionally and serially transferring data from a transmitting device to a receiving device, comprising:

a parallel-to-serial (P/S) converter provided in the transmitting device, the P/S converter performing a first conversion operation by converting a parallel data stream in the transmitting device to a serial data stream, the P/S converter transmitting the serial data stream to the receiving device via a data transfer channel, the serial data stream including transfer frames which have a predefined format;

a serial-to-parallel (S/P) converter provided in the receiving device, the S/P converter performing a second conversion operation by converting the transmitted serial data stream to the parallel data stream;

a clock signal generating device generating a clock signal and transmitting the clock signal to the P/S converter of the transmitting device for performing the first conversion operation, wherein the transmitting device further transmits the clock signal to the S/P converter of the receiving device for performing the second conversion operation, the first and second conversion operations being performed in a continuous and in-phase manner; and a synchronizing device generating a synchronizing signal based on the clock signal and as a function of the first conversion operation of the P/S converter and providing the synchronizing signal to the S/P converter for synchronizing the second conversion operation of the S/P converter.

2. The data transfer device according to claim 1, wherein the P/S converter includes:

an input register clocked with the clock signal, the input register including a first parallel input for receiving the parallel data stream and a parallel output for transmitting a parallel output signal, a shift register clocked with the clock signal, the shift register including a second parallel input for receiving the parallel output signal and a serial output for transmitting the serial data stream to the data transfer channel, and an internal bus connecting the parallel output of the input register to the second parallel input of the shift register.

3. The data transfer device according to claim 2, wherein the synchronizing device includes a synchronizing frame generating device for generating and inserting a predetermined synchronizing frame into the serial data stream at the serial output of the shift register.

4. The data transfer device according to claim 1, wherein the S/P converter includes:

a shift register clocked with the clock signal, the shift register has a serial input receiving the serial data stream and a first parallel output for transmitting a parallel output signal, an output register clocked with the clock signal, the output register includes a parallel input to receive the first parallel output signal of the shift register and a second parallel output for transmitting the parallel data stream, and an internal bus connecting the first parallel output of the shift register to the parallel input of the output register.

5. The data transfer device according to claim 2, wherein the S/P converter includes:

a further shift register clocked with the clock signal, the further shift register has a serial input receiving the serial data stream and a further parallel output for transmitting a further parallel output signal, an output register clocked with the clock signal, the output register includes a third parallel input receiving the further parallel output signal of the further shift register and a different parallel output for transmitting the parallel data stream, and a further internal bus connecting the further parallel output of the further shift register to the third parallel input of the output register.

6. The data transfer device according to claim 5, wherein each of a plurality of transfer frames has a predetermined format, the predetermined format including a start bit, a data word having a predetermined number of bits, a parity bit and a stop bit, and wherein a length of the shift register and the further shift register corresponds to a length of the predetermined format.

7. The data transfer device according to claim 6, wherein the synchronizing device includes a synchronizing frame recognition device for generating a predetermined synchronizing frame, wherein the predetermined synchronizing frame has the predetermined format, and wherein bits of the data word are set, and the parity bit does not correspond to a parity of the data word.

8. The data transfer device according to claim 6, wherein the P/S converter includes a parity generator connected to the internal bus and to the shift register for generating and providing the parity bit into the shift register, the parity bit corresponding to bits of the data word.

9. The data transfer device according to claim 6, wherein the S/P converter includes a parity generator connected to the further internal bus and to the output register for generating the parity bit and providing the parity bit as a load signal to the output register, the parity bit corresponding to bits of the data word.

10. The data transfer device according to claim 1, wherein the transmitter device includes a first device for changing a data word length of the parallel data stream and a second device for adjusting the synchronizing signal.

11. The data transfer device according to claim 1, wherein the receiving device includes a status check register for:

programming a data word length of the parallel data stream and a parity bit, and transmitting a status of the receiving device.

12. The data transfer device according to claim 1, wherein the receiving device includes an error memory device for storing faulty data transfers.

13. The data transfer device according to claim 1, further comprising:

a serial interface connecting the transmitting device to the receiving device for transmitting diagnostic functions.

14. The data transfer device according to claim 13, wherein the serial interface includes an SPI interface.

15. The data transfer device according to claim 1, wherein the transmitting device includes a microcontroller of a motor vehicle control unit, and wherein the receiving device includes an output stage IC of the motor vehicle control unit.

16. The data transfer device according to claim 1, further comprising a separate transmission path coupled between the transmitting device and the receiving device, wherein the synchronizing signal is transmittable via the separate transmission path from the transmitting device to the receiving device.

17. The data transfer device according to claim 1, further comprising another separate transmission path coupled between the transmitting device and the receiving device, wherein the clock signal is transmittable via the another separate transmission path from the transmitting device to the receiving device.

18. The data transfer device according to claim 1, further comprising:

a separate transmission path coupled between the transmitting device and the receiving device, wherein the synchronizing signal is transmittable via the separate transmission path from the transmitting device to the receiving device; and another separate transmission path coupled between the transmitting device and the receiving device, wherein the clock signal is transmittable via the another separate transmission path from the transmitting device to the receiving device.

19. A data transfer device for unidirectionally and serially transferring data from a transmitting device to a receiving device, comprising:

a parallel-to-serial (P/S) converter provided in the transmitting device, the P/S converter performing a first conversion operation by converting a parallel data stream in the transmitting device to a serial data stream, the P/S converter transmitting the serial data stream to the receiving device via a data transfer channel, the serial data stream including transfer frames which have a predefined format, wherein the P/S converter includes:

an input register clocked with the clock signal, the input register including a first parallel input for receiving the parallel data stream and a parallel output for transmitting a parallel output signal;

a shift register clocked with the clock signal, the shift register including a second parallel input for receiving the parallel output signal and a serial output for transmitting the serial data stream to the data transfer channel; and an internal bus connecting the parallel output of the input register to the second parallel input of the shift register;

a serial-to-parallel (S/P) converter provided in the receiving device, the S/P converter performing a second conversion operation by converting the transmitted serial data stream to the parallel data stream;

a clock signal generating device generating a clock signal and transmitting the clock signal to the P/S converter of the transmitting device for performing the first conversion operation, wherein the transmitting device further transmits the clock signal to the S/P converter of the receiving device for performing the second conversion operation, the first and second conversion operations being performed in a continuous and in-phase manner; and a synchronizing device generating a synchronizing signal based on the clock signal and as a function of the first conversion operation of the P/S converter and providing the synchronizing signal to the S/P converter for synchronizing the second conversion operation of the S/P converter;

wherein the synchronizing device includes a decrementer clocked with the clock signal and generating a synchronizing pulse signal after a preselected decrementing cycle; and wherein the shift register is controlled using the synchronizing pulse for receiving the parallel output signal of the input register transmitted via the internal bus.

20. A data transfer device for unidirectionally and serially transferring data from a transmitting device to a receiving device, comprising:

a parallel-to-serial (P/S) converter provided in the transmitting device, the P/S converter performing a first conversion operation by converting a parallel data stream in the transmitting device to a serial data stream, the P/S converter transmitting the serial data stream to the receiving device via a data transfer channel, the serial data stream including transfer frames which have a predefined format;

a serial-to-parallel (S/P) converter provided in the receiving device, the S/P converter performing a second conversion operation by converting the transmitted serial data stream to the parallel data stream wherein the S/P converter includes:

a shift register clocked with the clock signal, the shift register has a serial input receiving the serial data stream and a first parallel output for transmitting a parallel output signal;

an output register clocked with the clock signal, the output register includes a parallel input to receive the first parallel output signal of the shift register and a second parallel output for transmitting the parallel data stream; and an internal bus connecting the first parallel output of the shift register to the parallel input of the output register;

a clock signal generating device generating a clock signal and transmitting the clock signal to the P/S converter of the transmitting device for performing the first conversion operation, wherein the transmitting device further transmits the clock signal to the S/P converter of the receiving device for performing the second conversion operation, the first and second conversion operations being performed in a continuous and in-phase manner; and a synchronizing device generating a synchronizing signal based on the clock signal and as a function of the first conversion operation of the P/S converter and providing the synchronizing signal to the S/P converter for synchronizing the second conversion operation of the S/P converter, wherein the synchronizing device includes a decrementer clocked with the clock signal, the decremeter generating a synchronizing pulse after a predetermined decrementing cycle; and wherein the output register is controlled using the synchronizing pulse for receiving the parallel output signal of the shift register transmitted over the internal bus.

21. A data transfer device for unidirectionally and serially transferring data from a transmitting device to a receiving device, comprising:

a parallel-to-serial (P/S) converter provided in the transmitting device, the P/S converter performing a first conversion operation by converting a parallel data stream in the transmitting device to a serial data stream, the P/S converter transmitting the serial data stream to the receiving device via a data transfer channel, the serial data stream including transfer frames which have a predefined format, wherein the P/S converter includes:

an input resister clocked with the clock signal, the input register including a first parallel input for receiving the parallel data stream and a parallel output for transmitting a parallel output signal;

a shift resister clocked with the clock signal, the shift register including a second parallel input for receiving the parallel output signal and a serial output for transmitting the serial data stream to the data transfer channel; and an internal bus connecting the parallel output of the input register to the second parallel input of the shift register;

a serial-to-parallel (S/P) converter provided in the receiving device, the S/P converter performing a second conversion operation by converting the transmitted serial data stream to the parallel data stream, wherein the S/P converter includes:

a further shift register clocked with the clock signal, the further shift register has a serial input receiving the serial data stream and a further parallel output for transmitting a further parallel output signal;

an output register clocked with the clock signal, the output register includes a third parallel input receiving the further parallel output signal of the further shift register and a different parallel output for transmitting the parallel data stream; and a further internal bus connecting the further parallel output of the further shift register to the third parallel input of the output register;

a clock signal generating device generating a clock signal and transmitting the clock signal to the P/S converter of the transmitting device for performing the first conversion operation, wherein the transmitting device further transmits the clock signal to the S/P converter of the receiving device for performing the second conversion operation, the first and second conversion operations being performed in a continuous and in-phase manner; and a synchronizing device generating a synchronizing signal based on the clock signal and as a function of the first conversion operation of the P/S converter and providing the synchronizing signal to the S/P converter for synchronizing the second conversion operation of the S/P converter, wherein the synchronizing device includes a decrementer clocked with the clock signal, the decremeter generating a synchronizing pulse after a predetermined decrementing cycle; and wherein the output register is controlled using the synchronizing pulse for receiving the further parallel output signal of the further shift register transmitted via the further internal bus.

22. A data transfer device for unidirectionally and serially transferring data from a transmitting device to a receiving device, comprising:

a parallel-to-serial (P/S) converter provided in the transmitting device, the P/S converter performing a first conversion operation by converting a parallel data stream in the transmitting device to a serial data stream, the P/S converter transmitting the serial data stream to the receiving device via a data transfer channel, the serial data stream including transfer frames which have a predefined format wherein the P/S converter includes:

an input register clocked with the clock signal, the input register including a first parallel input for receiving the parallel data stream and a parallel output for transmitting a parallel output signal;

a shift register clocked with the clock signal, the shift register including a second parallel input for receiving the parallel output signal and a serial output for transmitting the serial data stream to the data transfer channel; and an internal bus connecting the parallel output of the input resister to the second parallel input of the shift register;

a serial-to-parallel (S/P) converter provided in the receiving device, the S/P converter performing a second conversion operation by converting the transmitted serial data stream to the parallel data stream, wherein the S/P converter includes:

a further shift register clocked with the clock signal, the further shift register has a serial input receiving the serial data stream and a further parallel output for transmitting a further parallel output signal;

an output register clocked with the clock signal, the output register includes a third parallel input receiving the further parallel output signal of the further shift register and a different parallel output for transmitting the parallel data stream; and a further internal bus connecting the further parallel output of the further shift register to the third parallel input of the output register;

a clock signal generating device generating a clock signal and transmitting the clock signal to the P/S converter of the transmitting device for performing the first conversion operation, wherein the transmitting device further transmits the clock signal to the S/P converter of the receiving device for performing the second conversion operation, the first and second conversion operations being performed in a continuous and in-phase manner; and a synchronizing device generating a synchronizing signal based on the clock signal and as a function of the first conversion operation of the P/S converter and providing the synchronizing signal to the S/P converter for synchronizing the second conversion operation of the S/P converter, wherein the synchronizing device includes a first synchronizing frame recognition device for generating and inserting a predetermined synchronizing frame into the serial data stream at the serial output of the shift register;

wherein the S/P converter includes a second synchronizing frame recognition device for recognizing the predetermined synchronizing frame in the further shift register; and wherein the output register is controlled using at least one of the first and second synchronizing frame recognition devices for receiving the further parallel output signal of the further shift register transmitted via the further internal bus.

23. A data transfer device for unidirectionally and serially transferring data from a transmitting device to a receiving device, comprising:

a parallel-to-serial converter provided in the transmitting device, the parallel-to-serial converter performing a first conversion operation by converting a parallel data stream in the transmitting device to a serial data stream, the parallel-to-serial converter transmitting the serial data stream to the receiving device via a data transfer channel, the serial data stream including transfer frames having a predefined format;

a serial-to-parallel converter provided in the receiving device, the serial-to-parallel converter performing a second conversion operation by converting the transmitted serial data stream to the parallel data stream;

means for generating a clock signal and transmitting the clock signal to the parallel-to-serial converter and to the serial-to-parallel converter for performing the first conversion operation and the second conversion operation in an in-phase manner;

means for generating a synchronizing signal based on the first conversion operation of the parallel-to-serial converter; and means for transmitting the synchronizing signal to the serial-to-parallel converter for synchronizing the second conversion operation of the serial-to-parallel converter.

24. A data transfer system for unidirectionally and serially transferring data, the system comprising:

a clock line for providing a clock signal;

a reset line for providing a reset signal;

a serial data line;

a transmitting arrangement including:

a parity generator arrangement for generating parity data;

a shift register arrangement being coupled to the clock line and the reset line, and being coupled to the parity generator arrangement for receiving the parity data, the shift register arrangement using the serial data line to output serial data;

an input register arrangement for receiving parallel data from a microcontroller, the input register arrangement being coupled to the clock line, the reset line, the parity generator arrangement and the shift register arrangement, wherein the shift register arrangement outputs the serial data based on the parallel data and the parity data; and a synchronizing arrangement being coupled to the clock line and the reset line for providing a synchronizing signal, and being coupled to the shift register arrangement for providing the synchronizing signal thereto, wherein the synchronizing arrangement is a decrementer arrangement; and a receiving arrangement coupled to the transmitting arrangement, the receiving arrangement including:

another parity generator arrangement for generating another parity data;

another shift register arrangement coupled to the clock line, the reset line and the serial data line, and coupled to the another parity generator arrangement for receiving the another parity data, the another shift register arrangement converting the serial data line to another parallel data; and an output register arrangement for receiving the another parallel data from the another shift register arrangement, the output register arrangement being coupled to the clock line, the reset line, the another parity generator arrangement, the synchronizing arrangement and the another shift register arrangement, wherein the output register arrangement outputs the parallel data based on the another parallel data, the another parity data and the synchronization signal.

* * * * *